Nov. 2, 1948.  H. F. HOLCOMB  2,452,929
FOLDING GOLF CART
Filed Aug. 19, 1946
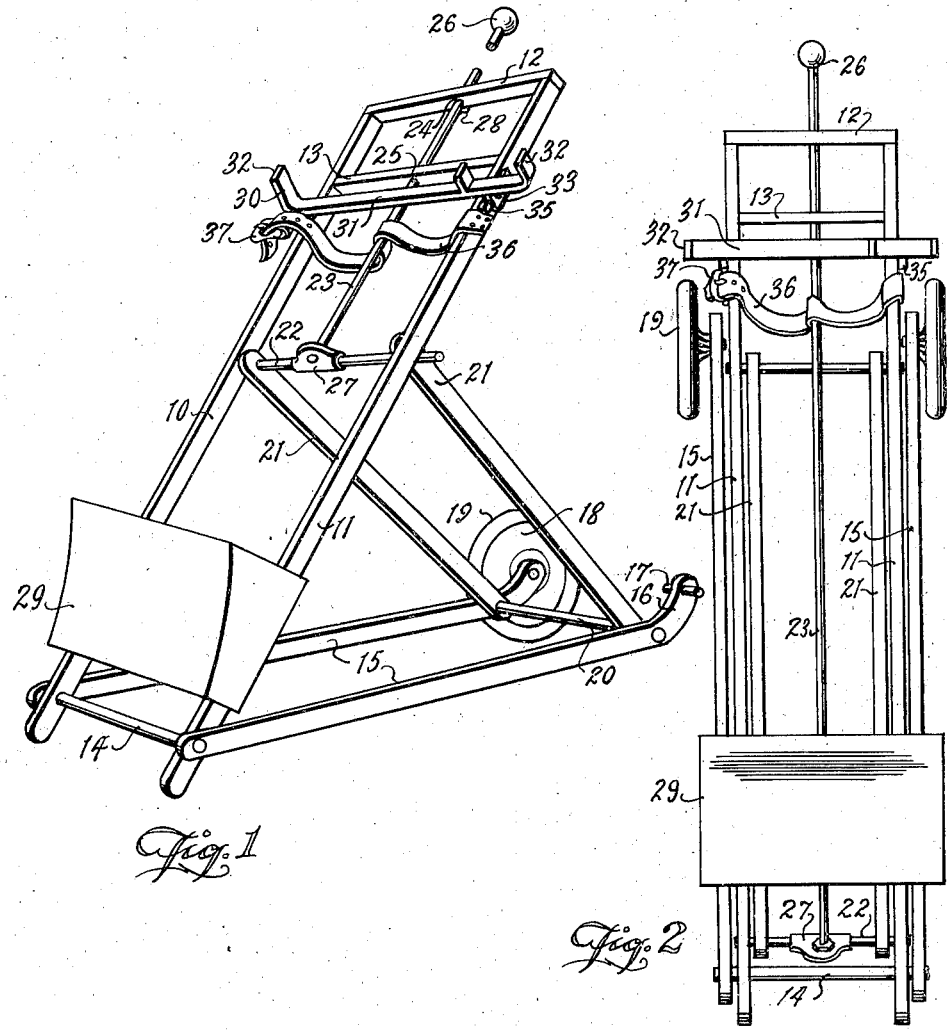
Fig. 1
Fig. 2
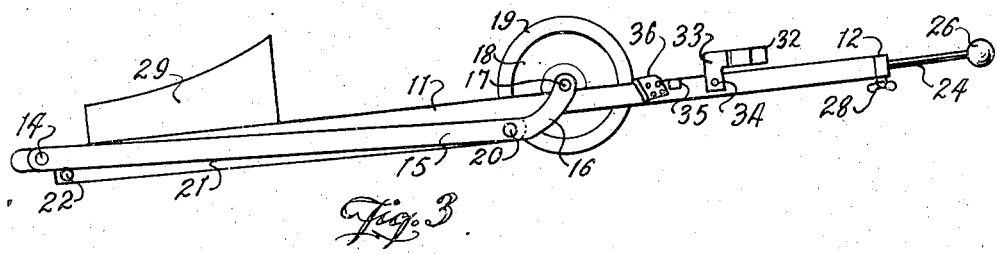
Fig. 3
INVENTOR.
Harry F. Holcomb
BY Ahley & Ahley
ATTORNEYS Patented Nov. 2, 1948

2,452,929

UNITED STATES PATENT OFFICE 2,452,929

FOLDING GOLF CART

Harry F. Holcomb, Dallas, Tex.

Application August 19, 1946, Serial No. 691,521

7 Claims. (Cl. 280—36)

This invention relates to new and useful improvements in golf carts.

One object of the invention is to provide an improved golf cart adapted to carry golf bags or golf clubs without a bag and arranged for easy handling and capable of being propelled with a minimum of physical exertion.

A further object of the invention is to provide an improved collapsible golf cart adapted to fold into an elongate relatively flat form without the use of numerous and intricate fixtures and which may be easily and expeditiously collapsed or extended.

Still another object of the invention is to provide an improved golf cart having a single pair of ground wheels located medially of the carrying frame so that when the cart is loaded, the wheels will be approximately coincident with the center of gravity of the load, and the cart thus substantially balanced and the strain of the load upon the arm of the golfer propelling the cart, reduced to a minimum.

Yet another object of the invention is to provide an improved golf cart adapted to carry either a golf bag or loose golf clubs and wherein means are provided for holding the bag or clubs against displacement from the cart by jostling or bumping.

A still further object of the invention is to provide an improved golf cart which may be folded or extended with a golf bag or golf clubs in position thereon without necessitating the removal of the bag or clubs for such operations.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a perspective view of a golf cart constructed in accordance with the invention, in its extending or operating position, Fig. 2 is a plan view of the cart in its collapsed position, and Fig. 3 is a side elevation of the same.

In the drawings, the numeral 10 represents an elongate rectangular frame substantially equal in length to the average golf club, and being somewhat wider than the usual golf bag. The frame is formed with elongate vertical side bars 11 joined at their upper ends by a transverse bar 12 and having a similar bar 13 extending transversely between the side bars at a point spaced a short distance below the upper bar 12. An elongate rod 14 extends transversely of the side bars at the lower ends thereof, the rod 14 being circular in cross-section. The rod engages the side bars at a point spaced above the lower extremity thereof and extends through said bars so as to project a short distance on either side of the frame 10.

A pair of elongate connecting members 15 are pivotally mounted upon the projecting ends of the rod 14 and extend in parallel alinement rearwardly of the lower end of the frame. The rearward end 16 of each of the members 15 is curved upwardly and carries a short stub axle 17 upon which ground wheels 18 are journaled. The wheels 18 may carry rubber tires 19, if desired, or may be of any other suitable construction. A cylindrical rod 20 is connected to and extends between the rearward ends of the connecting members 15, and is positioned forward of the curved portion 16 of said members. A pair of elongate props 21 are pivoted upon the rod 20 and extend upwardly and forwardly in a vertical plane therefrom at an angle, the props being spaced inwardly from the members 15 for reasons to be hereinafter set out. A rod 22, similar to the rod 20, extends transversely of the upper ends of the props and projects therebeyond so as to have its outer ends engaging beneath the medial portion of the side bars 11. It is pointed out, that the rod 22 is of sufficient length to engage the side bars, but is not so long as to prevent its passing between the connecting members 15.

The props thus hold the frame in an inclined position with respect to the connecting members, and with respect to the ground upon which the cart rests. The extreme lower ends of the side bars 11 support the forward end of the cart, while the rearward end is supported upon the wheels 18.

An elongate cylindrical plunger 23 slightly greater in length than the frame 10 extends longitudinally of the frame, and passes through openings 24 and 25 formed in the central portions of the bars 12 and 13, respectively, the upper end of the plunger projecting above the upper end of the frame. The plunger carries a spherical knob 26, or other suitable handle means, upon its upper end, and has its lower end connected to a bracket 27, which encircles the rod 22 near the medial portion thereof. Thus, the plunger 23 and the rod 22 are flexibly connected so that movement of the plunger controls movement of the rod and the props 21 connected thereto.

A winged bolt 28 engages within a screw-threaded opening (not shown) formed in the bar 12 at right angles to the opening 24 and in vertical alinement therewith. Obviously, tightening of the bolt 28 within the opening will cause the end of the bolt to engage the plunger 23 and lock the same in position with respect to the bar 12 and the frame 10. In this manner, the angular adjustment of the props 21 with respect to the connecting members 15, and also the angular adjustment of the frame 10 with respect to said members, may be accomplished by moving the plunger 23 longitudinally of the frame 10 and locking the plunger in the desired position by tightening the winged bolt 28.

A rectangular boot 29 is secured to the lower outer portion of the side bars 11 and has its open upper end directed upwardly so as to receive the lower end of a golf bag (not shown) or of golf clubs (not shown). The boot 29 may be of any desirable shape and size, as long as it is capable of receiving the lower end of the usual golf bag. In the embodiment shown, the boot is substantially rectangular in shape, having its forward wall curved so that the boot is wider at the top than at the bottom. Such an arrangement is optional and may be varied within the scope of the invention.

A saddle 30 extends transversely of the frame 10 near the upper end thereof, and is formed of an elongate bar 31 having a plurality of fingers 32 projecting forwardly therefrom. As will be noted in the drawings, the fingers 32 are unevenly spaced so as to allow segregation of the different types of golf clubs, such as wood clubs from iron clubs. A pair of angular L-shaped brackets 33 are secured to the rearward face of the bar 31, and so spaced laterally on said bar as to be in substantial vertical alinement with the side bars 11. The opposite ends of brackets 33 are pivoted to the side bars by suitable pins 34, so that the saddle 30 may be swung upwardly into an inoperative position, as is shown in Fig. 3 of the drawings, or may be swung downwardly into an operative position, as is shown in Figs. 1 and 2 of the drawings. In the latter position, a lug 35 extending laterally of one of the side bars 11, is adapted to be engaged by one of the brackets 33 so as to limit the downward swing thereof.

A strap 36, which may be of fabric or leather or any other desirable material, is secured to one of the side bars near the bracket 33, and is adapted to engage a buckle 37 carried by the other side bar in horizontal alinement with said strap. The purpose of the strap 36 and buckle 37, is to provide means for securing the upper end of a golf bag, or the upper ends of golf clubs to the frame 10, so that dislodgement is prevented. Obviously, any desirable or suitable means may be utilized to accomplish this fastening or securing action.

In the operation of this golf cart, the cart will normally be in the folded position shown in Fig. 3 of the drawings, when not in use. If desired, the golf bag may be left in position upon the cart when folded, or the golf clubs carried by the cart may be left in position and strapped into snug engagement with the cart by means of the strap 36. When it is desired to use the cart, it may be extended to an operating position by pulling upon the handle 26 and thus the plunger 23 and lifting the same. This action draws the rod 22 and the props 21 upwardly, at the same time swinging the frame 10 about the rod 14. When the cart has reached a fully extended position as shown in Fig. 1 of the drawings, the wing bolt 28 may be tightened to lock the cart in this position. It is then ready for use. As the cart rests upon the ground, the golf clubs carried thereby are readily available for removal from and replacement on the cart. The connecting members 15 provide a stable base for the cart, so that it is not liable to accidental upset.

For moving the cart about between shots or holes on a golf course, depression of the handle 26 will swing the lower end of the frame and the forward end of the connecting members upwardly from the ground so that the cart is supported entirely upon the wheels 18. The cart can then be moved about and guided with one hand of the operator grasping the handle 26. It is pointed out, that the location of the wheels 18 with respect to the frame 10 is instrumental in achieving balance of the cart and a resultant minimum of fatigue incurred by the user. When the cart is in an elevated position, the wheels 18 are disposed in substantial vertical alinement with the center of gravity of the cart and the golf bag, whereby there is very little tendency for the cart to tip either way, and the largest portion of the exertion necessary to move it about is that required merely to overcome friction offered by the ground to the wheels 18. In this position, the frame 10 is substantially parallel to the ground so that the golf clubs are securely carried thereby.

When it is desired no longer to use the cart, it may be readily folded by releasing the wing bolt 28 and sliding the plunger 23 downwardly with respect to the frame 10. The cart is thereby collapsed into a folded position, wherein the side bars 11 lie adjacent and within the connecting members 15, resting upon the transverse rod between the members 15 and the lower ends of the props 21. The props swing downwardly to a position parallel to and within the side bars 11, the rod 22 passing between the connecting members 15 so as to allow more complete and compact folding. The upwardly curved portions 16 of the members 15 serve to position the wheels 18 symmetrically with respect to the horizontal plane of the cart when folded. The wheels thus project a substantially equal distance upon either side of the folded cart to afford a minimum of projections therefrom. The wing nut 28 may then be tightened to lock the cart in a folded position.

It is pointed out that the use of the saddle 30 is optional, and that it would not be required when it is desired to utilize the cart with a golf bag. In this instance, the saddle would not be required, and its omission is contemplated by this invention, and falls within the scope thereof.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A collapsible golf cart including, an elongate carrying frame having means for retaining golf clubs thereon, a pair of connecting members pivoted at their forward ends to the forward end of the frame, a single pair of ground wheels journaled on the rear ends of the members, a pair of props having their lower ends pivoted to the members adjacent the ground wheels, a connection at the upper ends of the props slidably engaging the medial portion of the frame, and means carried by the frame flexibly attached to the connecting means for fastening the prop connection in position.

2. A collapsible golf cart including, an elongate rigid frame, a boot at the forward end of the frame, a transverse saddle across the frame, a pair of connecting members pivoted at their forward ends to the forward end of the frame, a single pair of ground wheels journaled on the rear ends of the members, a pair of props having their lower ends pivoted to the members adjacent the ground wheels, a connection at the upper ends of the props slidably engaging the medial portion of the frame, and means carried by the frame for fastening the connection in position.

3. A collapsible golf cart including, an elongate carrying frame having means for retaining golf clubs thereon, a pair of connecting members pivoted at their forward ends to the forward end of the frame, a single pair of ground wheels journaled on the rear ends of the members, a pair of props having their lower ends pivoted to the members adjacent the ground wheels, a bridle bar connecting the upper ends of the props and slidably engaging the medial portion of the frame, a plunger connected to the bar and slidable in the frame, and means for fastening the plunger in position.

4. A collapsible golf cart including, an elongate carrying frame having means for retaining golf clubs thereon, a pair of connecting members pivoted at their forward ends to the forward end of the frame, a single pair of ground wheels journaled on the rear ends of the members, a pair of props having their lower ends pivoted to the members adjacent the ground wheels, a bridle bar connecting the upper ends of the props and slidably engaging the medial portion of the frame, a plunger having flexible connection with the bar and slidable in the frame, and means for fastening the plunger in position.

5. A collapsible golf cart including, an elongate frame having side bars, connecting members pivoted at their forward ends to the forward ends of the side bars so as to lie outside of said bars when the cart is collapsed, props pivoted at their lower ends to the rear portions of members and spaced therefrom so as to lie between the side bars when the cart is collapsed, a bridle bar connecting the upper ends of the props within the frame and having its end engaging the side bars, the length of the bridle bar being less than the distance between said members so as to pass therebetween when the cart is collapsed, ground wheels journaled in the rear ends of the members, and means carried by the frame for fastening the bridle bar in position when the cart is extended.

6. A collapsible cart as set forth in claim 5, a boot attached to the forward end of the frame, and a transverse saddle mounted on the frame.

7. A collapsible golf cart including, an elongate carrying frame having means for retaining golf clubs thereon, a pair of connecting members pivoted at their forward ends to the forward end of the frame, a single pair of ground wheels journaled on the rear ends of the members, a pair of props having their lower ends pivoted to said members adjacent the ground wheels, a connection at the upper ends of the props slidably engaging the medial portion of the frame, and means carried by the frame for fastening the connection in position, the rear ends of said members being curved toward the wheel journals to provide a more complete collapsing of the cart.

HARRY F. HOLCOMB.

REFERENCES CITED

The following references are of record in the file of this patent:

UNITED STATES PATENTS

| Number | Name | Date |
| --- | --- | --- |
| 1,208,109 | Decker | Dec. 12, 1916 |
| 2,120,425 | Frey | June 14, 1938 |
| 2,228,046 | Bird | Jan. 7, 1941 |